J. C. Miles.
Mower.
No. 104,482.            Patented June 21, 1870.
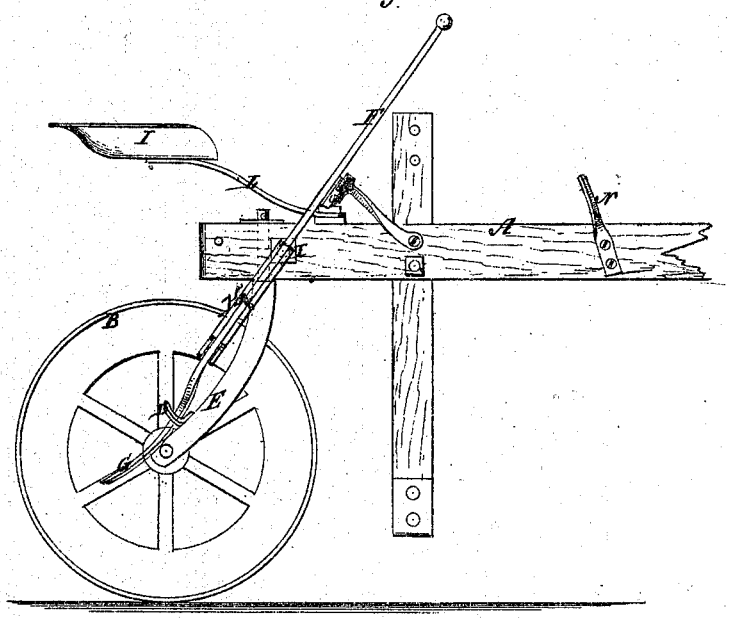
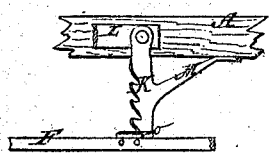
Witnesses:
L. S. Mabee
Alex. F. Roberts
Inventor:
Jessie C. Miles
per M. Munn
Attorneys.

UNITED STATES PATENT OFFICE.

JESSE C. MILES, OF BLOOMINGTON, WISCONSIN.

IMPROVEMENT IN HARVESTERS.

Specification forming part of Letters Patent No. 104,482, dated June 21, 1870.

*To all whom it may concern:*

Be it known that I, JESSE C. MILES, of Bloomington, in the county of Grant and State of Wisconsin, have invented a new and useful Improvement in Reapers and Mowers; and I do hereby declare that the following is a full, clear, and exact description thereof, which will enable others skilled in the art to make and use the same, reference being had to the accompanying drawing, forming part of this specification.

This invention relates to improvements in reaping and mowing machines; and consists in improved attachments for guiding the caster-wheels to hold the machine up to the standing grain to cut the full breadth on side hills; also to prevent it from tipping over and to prevent side draft.

Figure 1 represents a side elevation of the caster-wheel and a part of the caster-beam with my improved attachments applied, and Fig. 2 is a detail in plan view.

Similar letters of reference indicate corresponding parts.

A is the caster-wheel beam, B the caster-wheel, and I the raker's seat, of the said machine.

I propose to attach the hook D to the outside part, E, of the caster-wheel yoke, a short distance from the axle of the wheel, and to mount a hand-lever, F, with a long curved hook, G, on one end, on a cranked bolt, H, journaled in the caster-beam, near the rear end, under the raker's seat I, so as to oscillate freely in a vertical plane, and in front of the raker's seat I connect the notched catch-bar K to the beam, preferably by the same bolt which secures the seat-spring L, so that the said bar projects laterally from the top of the beam with the notches at the rear. The said bar is provided with a brace, M, to strengthen it. I also attach a bent hook, N, to the caster-beam, about as far forward as the hand-lever F will reach when turned down parallel with the beam. The lever F is provided with a catch, O, for engaging with the bar K.

When the machine is working in the ordinary way, the lever F is turned down parallel with the beam A, and rests on the hook N until it is necessary to change the position of the caster-wheel, to keep the machine up to the grain, and to prevent side draft. Then the raker takes the lever in hand, raises it out of hook N, moves it outward around the hook-plate K, and, by the same act, engages the hook G with hook D, as shown in Fig. 1. Then, by moving the lever F inward, the caster-wheel is inclined toward the standing grain more or less, as may be required, to cause the machine to run close up to it, to prevent the side draft, and preventing the machine from turning over. The lever is then engaged with the notched plate, to hold the caster-wheel in the inclined position as long as required.

Having thus described my invention, I claim as new and desire to secure by Letters Patent—

The arrangement, with the beam A and the caster-wheel, of the hook D, arm E, hooked lever F, and catch-bar K, substantially as specified.

JESSE C. MILES.

Witnesses:
J. W. ROBERTS,
JESSE MILES, Jr.